(12) United States Patent
Nakazato et al.

(10) Patent No.: US 12,389,280 B2
(45) Date of Patent: Aug. 12, 2025

(54) APPARATUS AND METHOD FOR DISTRIBUTED DATA PROCESSING IN SHARED RAN

(71) Applicant: RAKUTEN MOBILE, INC., Tokyo (JP)

(72) Inventors: Jin Nakazato, Tokyo (JP); Saki Tanaka, Tokyo (JP); Haruka Horiuchi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/040,053

(22) PCT Filed: May 31, 2022

(86) PCT No.: PCT/JP2022/022225
§ 371 (c)(1),
(2) Date: Jan. 31, 2023

(87) PCT Pub. No.: WO2023/233555
PCT Pub. Date: Dec. 7, 2023

(65) Prior Publication Data
US 2024/0251296 A1    Jul. 25, 2024

(51) Int. Cl.
*H04W 4/40* (2018.01)
*H04W 28/18* (2009.01)

(52) U.S. Cl.
CPC .................................. *H04W 28/18* (2013.01)

(58) Field of Classification Search
CPC ....... H04W 16/10; H04W 24/02; H04W 4/08; H04W 4/46; H04W 76/20; H04W 72/02; H04W 28/18; H04W 28/24; H04W 48/10; H04M 15/66; H04L 1/0003; A23L 5/20; B08B 9/032; G06F 16/9535
See application file for complete search history.

(56) References Cited

U.S. PATENT DOCUMENTS

| | | | | |
|---|---|---|---|---|
| 2016/0295579 | A1* | 10/2016 | Pham | H04W 28/24 |
| 2023/0107525 | A1* | 4/2023 | Gupta | H04W 8/06 |
| | | | | 455/435.2 |

OTHER PUBLICATIONS

"3rd Generation Partnership Project; Technical Specification Group Services and System Aspects; Network Sharing; Architecture and functional description (Release 16)", 3GPP TS 23.251 V16.0.0 (Jul. 2020), Technical Specification, 39 pages, https://www.3gpp.org/ftp/Specs/archive/23_series/23.251/23251-g00.zip.

* cited by examiner

*Primary Examiner* — Phuoc H Doan
(74) *Attorney, Agent, or Firm* — Sughrue Mion, PLLC

(57) ABSTRACT

A management apparatus of a RAN that is shared by a plurality of operators, the RAN comprising: a CU; a first DU that is communicably connected to the CU; a second DU that is communicably connected to the CU; and an RU that are communicably connected to the first DU and the second DU, wherein the management apparatus comprises a processor that executes: until an amount of traffic being monitored in the RAN reaches a predetermined range, selecting one operator, among the plurality of operators, that has entered into a guarantee type Service Level Agreement (SLA) with a user; and transmitting instructions to the CU, the first DU, and the second DU to cause the second DU to process at least a portion of the data for a User Equipment that is communicably connected with the RU and that has entered into the guarantee type SLA with the selected operator.

9 Claims, 12 Drawing Sheets

APPARATUS AND METHOD FOR DISTRIBUTED DATA PROCESSING IN SHARED RAN

CROSS REFERENCE TO RELATED APPLICATIONS

This application is a National Stage of International Application No. PCT/JP2022/022225 filed May 31, 2022.

TECHNICAL FIELD

The present disclosure relates to a Radio Access Network (RAN) management apparatus for distributing data processing in DUs of a shared RAN, and a RAN management method.

BACKGROUND

Future mobile communication networks are premised on the ubiquitous society. In order to satisfy the requirements of Enhanced Mobile Broadband (eMBB), Ultra-Reliable and Low Latency Communications (URLLC), and Massive Machine Type Communication (mMTC), the installation of a larger number of radios than ever is required. Physical space is finite, is subject to many restrictions, and has a lot of problems such as scenery becoming spoiled, thus efficient use of space is required.

Therefore, there is a concept of Radio Access Network (RAN) sharing, which makes it possible to aggregate multiple frequencies and multiple operators (mobile network operators) with a single radio.

Non-Patent Document 1 discloses a Gateway Core Network (GWCN) configuration in which operators operate a Core Network (CN) and multiple operators share a RAN and a gateway between the RAN and the CN.

Non-Patent Document 1 further discloses a Multi-Operator Core Network (MOCN) in which operators operate a CN and a gateway between a RAN and the CN and multiple operators share the RAN.

Base stations of the RAN may include a Central Unit (CU), one or more Distributed Units (DUs) connected to the CU, and one or more Radio Units (RUs) connected to the DUs.

In one form of RAN sharing, regarding antennas in the RUs, emitted (or incoming) frequencies are separate for each operator.

In RAN sharing, current network services provided by operators are often a best-effort method, which defines effort values of a throughput.

Moreover, in RAN sharing, there are no known means for guaranteeing service quality (a guarantee method), which secures a lower limit of throughput even during congestion and the like.

CITATION LIST

Non-Patent Literature

Non-Patent Document 1: 3GPP TS 23.251 (2020-07) (https://www.3gpp.org/ftp/Specs/archive/23_series/23.251/23251-g00.zip)

SUMMARY OF INVENTION

Technical Problem

As described above, RAN sharing by a plurality of operators is advantageous from the perspective of effective use, etc., of space for installing base stations.

Communications with User Equipment (UEs) can strain usage resources of base stations (especially DUs) that are being shared. In such cases, it has been difficult to secure a lower limit of throughput for the UEs of users that have entered into Service Level Agreements (SLA) with operators.

The present disclosure was made in view of the circumstances described above, and an objective thereof is to provide a technology for increasing throughput for UEs that have entered into SLAs even when usage resources of DUs that are being shared are strained, thereby enabling fulfillment of the SLAs.

Solution to Problem

One aspect of a Radio Access Network (RAN) management apparatus according to the present disclosure is a management apparatus for a RAN that is shared by a plurality of operators.

The RAN includes a Central Unit (CU), a first Distributed Unit (DU) that is communicably connected to the CU, a second DU that is communicably connected to the CU, and a Radio Unit (RU) that is communicably connected to the first DU and the second DU.

A processor provided in the management apparatus executes the following procedures repeatedly until an amount of traffic monitored in the RAN reaches a predetermined range.

First, among the plurality of operators, an operator that has entered into a guarantee type Service Level Agreement (SLA) with a user is selected.

Next, instructions are transmitted to the CU, the first DU, and the second DU to cause the second DU to process, among data to be processed at the first DU for the RU, at least a portion of the data for a User Equipment (UE) that is communicably connected to the RU and that has entered into the guarantee type SLA with the selected operator.

Two or more of the plurality of operators may enter guarantee SLAs with the users.

The instructions may be transmitted when a resource usage rate of the first DU exceeds a predetermined first threshold or when an amount of traffic of each operator being monitored in the RAN exceeds a predetermined second threshold.

The portion of the data processed at the second DU may be determined by the type of data for the UE that has entered into the guarantee type SLA with the selected operator.

The type of the data for the UE that has entered into the guarantee type SLA with the selected operator may be defined for each application.

The portion of the data processed at the second DU may be a fixed percentage portion of the data for the UE that has entered into the guarantee type SLA with the selected operator.

The fixed percentage portion may be selected in resource block units.

One aspect of a method for managing a Radio Access Network (RAN) according to the present disclosure is a method for managing a RAN that is shared by a plurality of operators.

The management method includes providing the RAN, wherein the RAN includes a Central Unit (CU), a first Distributed Unit (DU) that is communicably connected to the CU, a second DU that is communicably connected to the CU, and a Radio Unit (RU) that is communicably connected to the first DU and the second DU.

The management method includes repeating the following procedures until the amount of traffic being monitored in the RAN reaches a predetermined range.

First, among the plurality of operators, one operator that has entered into a guarantee type Service Level Agreement (SLA) with a user is selected.

Next, the CU, the first DU, and the second DU are instructed to cause the second DU to process, among data to be processed at the first DU for the RU, at least a portion of the data for a User Equipment (UE) that is communicably connected to the RU and that has entered into the guarantee type SLA with the selected operator.

One aspect of a radio communication system according to the present disclosure includes a Radio Access Network (RAN) that is shared by a plurality of operators, and a management apparatus of the RAN.

The RAN includes a Central Unit (CU), a first Distributed Unit (DU) communicably connected to the CU, a second DU that is communicably connected to the CU, and a Radio Unit (RU) that is communicably connected to the first DU and the second DU.

A processor provided in the management apparatus executes the following procedures repeatedly until an amount of traffic monitored in the RAN reaches a predetermined range.

First, among the plurality of operators, one operator that has entered into a guarantee type Service Level Agreement (SLA) with a user is selected.

Next, instructions are transmitted to the CU, the first DU, and the second DU to cause the second DU to process, among data to be processed at the first DU for the RU, at least a portion of the data for a User Equipment (UE) that is communicably connected to the RU and that has entered into the guarantee type SLA with the selected operator.

DESCRIPTION OF EMBODIMENTS

Hereinafter, one embodiment of the present disclosure will be explained in detail with reference to the drawings.

Figure 1:
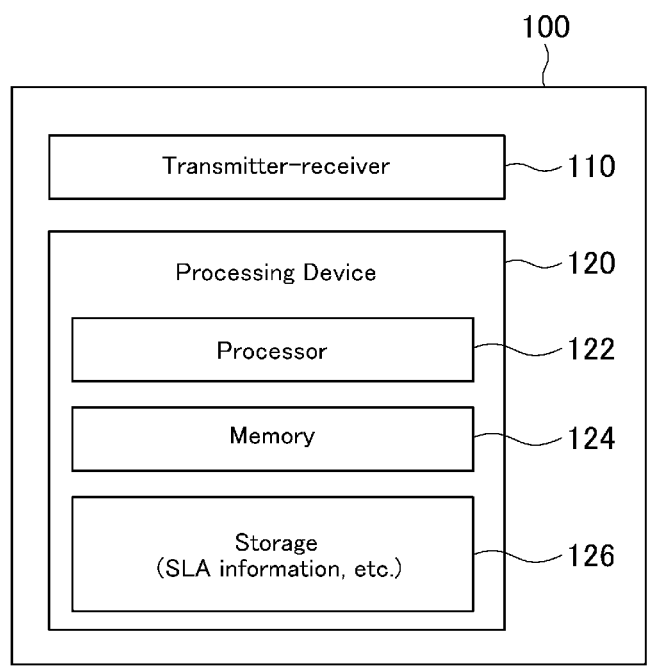
FIG. 1 is a diagram illustrating an example of a management apparatus according to one or more embodiments.

FIG. 1 is a diagram illustrating an example of a management apparatus 100 according to one or more embodiments. The management apparatus 100 is a Radio Access Network (RAN) management apparatus that controls the RAN.

Before describing the management apparatus 100 according to one or more embodiments, the RAN controlled by the management apparatus 100 will be described.

A RAN in an O-RAN compliant network system has base stations that include Central Units (CUs), Distributed Units (DUs), and Radio Units (RUs). The RAN includes one or more CUs. Each CU has one or more DUs communicably connected thereto. Each DU has one or more RUs connected thereto. RUs comprise antennas and communicates with User Equipment (UEs).

Hereinafter, to simplify the explanation, downlinks to UEs are exclusively considered. In particular, data transmission from a CU to a DU, from the DU to an RU, and then from the RU to a UE, and data processing at the DU and the RU will be described in detail. However, uplinks are also included within the scope of the present disclosure.

Figure 2:
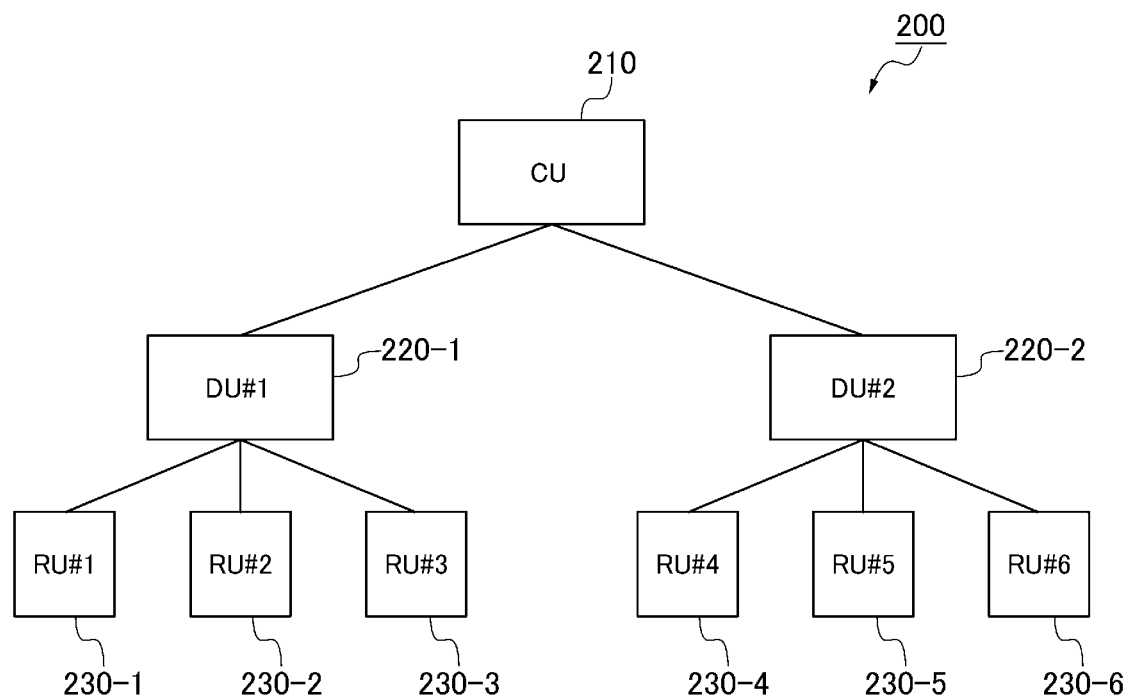
FIG. 2 is a diagram illustrating an example of a configuration of a RAN in an O-RAN compliant network system.

FIG. 2 is a diagram illustrating an example of a configuration of a RAN in an O-RAN compliant network system. FIG. 2 shows that RAN 200 includes one CU 210. The CU 210 is communicably connected to a DU 220-1 (also referred to as "DU #1") and a DU 220-2 (also referred to as "DU #2"). The DU 220-1 is communicably coupled to an RU 230-1, an RU 230-2, and an RU 230-3 (also referred to as "RU #1", "RU #2", and "RU #3", respectively). The DU 220-2 is communicably coupled to an RU 230-4, an RU 230-5, and an RU 230-6 (also referred to as "RU #4", "RU #5", and "RU #6", respectively).

Hereinafter, one or more DUs (DU #1 and DU #2 in FIG. 2) will be collectively referred to as DUs 220. In addition, one or more RUs (six RUs from RU #1 to RU #6 in FIG. 2) will be collectively referred to as RUs 230.

A virtualized CU (vCU) can be configured by virtualizing the functions of the CU 210. Virtualized DUs (vDUs) can be configured by virtualizing the functions of (one or more of) the DUs 220. Virtualization allows a general-purpose server to be used instead of a dedicated server, and a RAN to be configured inexpensively and flexibly.

Hereinafter, a "CU" may indicate a "vCU" on the premise of virtualization. In addition, a "DU" may indicate a "vDU".

Figure 3:
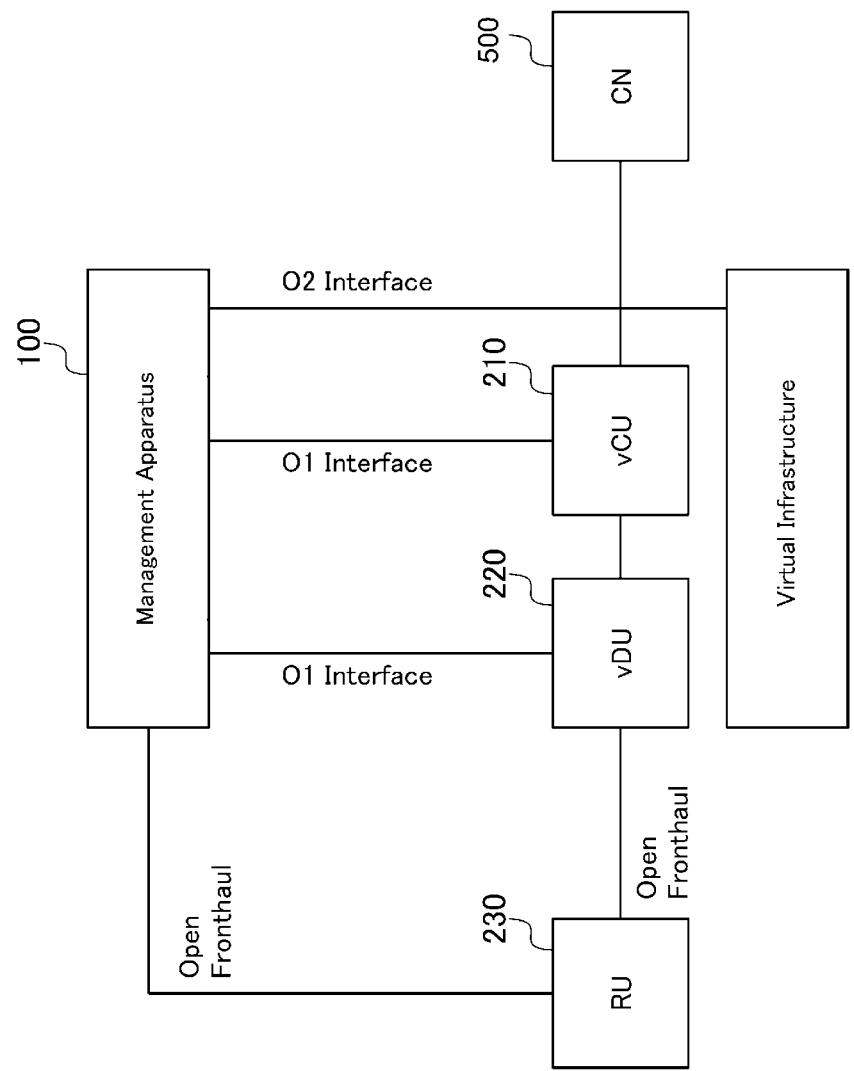
FIG. 3 is a diagram illustrating an example of a connection between a management apparatus and a RAN in an O-RAN compliant network system.

FIG. 3 is a diagram illustrating an example of a connection between the management apparatus 100 and a RAN in an O-RAN compliant network system.

The management apparatus 100 may be, for example, a RAN Intelligent Controller (RIC) defined by an O-RAN Alliance. The management apparatus 100 may be, in particular, a real-time RIC. The management apparatus 100 and a vCU 210 of the RAN are connected with an O1 interface. The management apparatus 100 and a vDU 220 of the RAN are connected with an O1 interface. The management apparatus 100 and a virtual infrastructure on which the vCU 210 and the vDU 220 are configured may be connected with an O2 interface.

As described below, the management apparatus may be communicably connected to a Multi-access Edge Computing (MEC) server and/or a monitoring server for monitoring the RAN.

Moreover, the vCU 210 is connected to a Core Network (CN) 500.

The RAN 200 of FIG. 2 may be a RAN that is shared by a plurality of operators (mobile network operators).

The configuration of FIG. 3 may be a Gateway Core Network (GWCN) configuration in which a plurality of operators shares a RAN and a gateway (not shown) between the RAN and a CN 500, and in which each operator operates the CN 500.

Alternatively, the configuration of FIG. 3 may be a Multi-Operator Core Network (MOCN) configuration in which a plurality of operators shares a RAN, and in which each operator operates a CN 500 and a gateway (not shown) between the RAN and the CN 500.

Each UE user enters into an agreement with an operator specific to that UE to receive communication service. Note that a user may enter into agreements with two or more operators for one UE to receive communication services. However, in the following description, the same user can be considered to have entered into an agreement for two UEs with one operator specific to each of the two UEs. Thus, even if each UE has an agreement with a specific operator, generality is not lost, and the present disclosure is applicable.

When a user of a UE receives communication service from an operator specific to that UE, the user can enter into an agreement for a service level thereof. Hereinafter, an abbreviation of Service Level Agreement "SLA" is used also to mean an agreed service level. The SLA has a guarantee type and a best-effort type.

The guarantee type secures a lower limit of throughput even during congestion.

The best-effort type defines effort values of throughput.

In the present disclosure, the SLA of the UEs will either be the guarantee type or the best-effort type. The UEs are also referred to as a "guarantee type UE" or a "best-effort type UE" depending on the SLA between the UE and the operator.

Hereinafter, suppose that the number of the operators sharing the RAN is represented by K. K is an integer greater than or equal to 1. Each operator is numbered from 1 to K, and is referred to as an "i-th operator" (wherein i is an integer from 1 to K, inclusive).

Returning to FIG. 1, the management apparatus 100 according to the present embodiment will be explained. The management apparatus 100 includes a transmitter-receiver 110 and a processing device 120. The management apparatus 100 may include components that are not shown in FIG. 1.

The processing device 120 includes a processor 122, a memory 124, and a storage 126. The processor 122 may comprise any number of one or more processors. The memory 124 may comprise any number of one or more memories.

The transmitter-receiver 110 is communicably connected to the CU and the DUs. The transmitter-receiver 110 exchanges data with the CU and with the DUs. The transmitter-receiver 110 can also be communicably connected to a MEC server and/or a monitoring server described below.

The processing device 120 is connected to the transmitter-receiver 110. The processing device 120 can control the RAN (in particular, the CU and the DUs) connected via the transmitter-receiver 110.

The functions of the processor 120 may be provided to software using the processor 122 and the memory 124.

The storage 126 may all be disposed inside the management apparatus 100 or at least a portion thereof may be disposed outside the management apparatus 100.

The storage 126 may comprise a database that stores information related to the quality of communication services that operators provide respective UEs, for one or more UEs connected to the RAN. Such a database is described below.

In the present disclosure, the processor 122 of the management apparatus 100 repeats the following operations to transfer at least a portion of the processing of the DU to another DU (referred to as "processing distribution") until the traffic being monitored in the RAN becomes normal.

(1) Select one operator, among a plurality of operators, which has entered into a guarantee type SLA with a user.

(2) Instruct a CU, a DU #1, and a DU #2 to cause the DU #2 to process, among data to be processed at the DU #1 for an RU, at least a portion of the data for a UE that is communicably connected to the RU and that the user thereof has entered into the guarantee type SLA with the selected operator.

"Traffic being monitored" in the RAN may be one or more traffic being monitored for each of the one or more operators. In particular, monitoring whether or not traffic of all operators that have entered into guarantee type SLAs with users is normal may be performed.

As a result thereof, a lower limit of throughput can be secured for the guarantee type UEs for all the operators that have entered into guarantee type SLAs.

If the amount of the traffic reaches a value in a predetermined range due to processing distribution, the traffic may be determined to have returned to normal. Alternatively, a determination as to whether or not the lower limit of the throughput for the guarantee type UE is secured may be made.

Regarding the plurality of operators that have entered into guarantee type SLAs with users, when the traffic is determined to be normal and the SLAs can be fulfilled, processing distribution does not need to be performed for all operators.

Triggers of processing distribution (procedures (1) and (2) above) may be, for example, a decrease of processing capacity of the DU #1 and/or an occurrence of communication congestion (meaning an increase in data to be processed by the DU #1).

Details of the control of the RAN by the management apparatus 100 according to the present disclosure will be further described below.

A more specific example of processing distribution is described with reference to FIG. 4.

Figure 4:
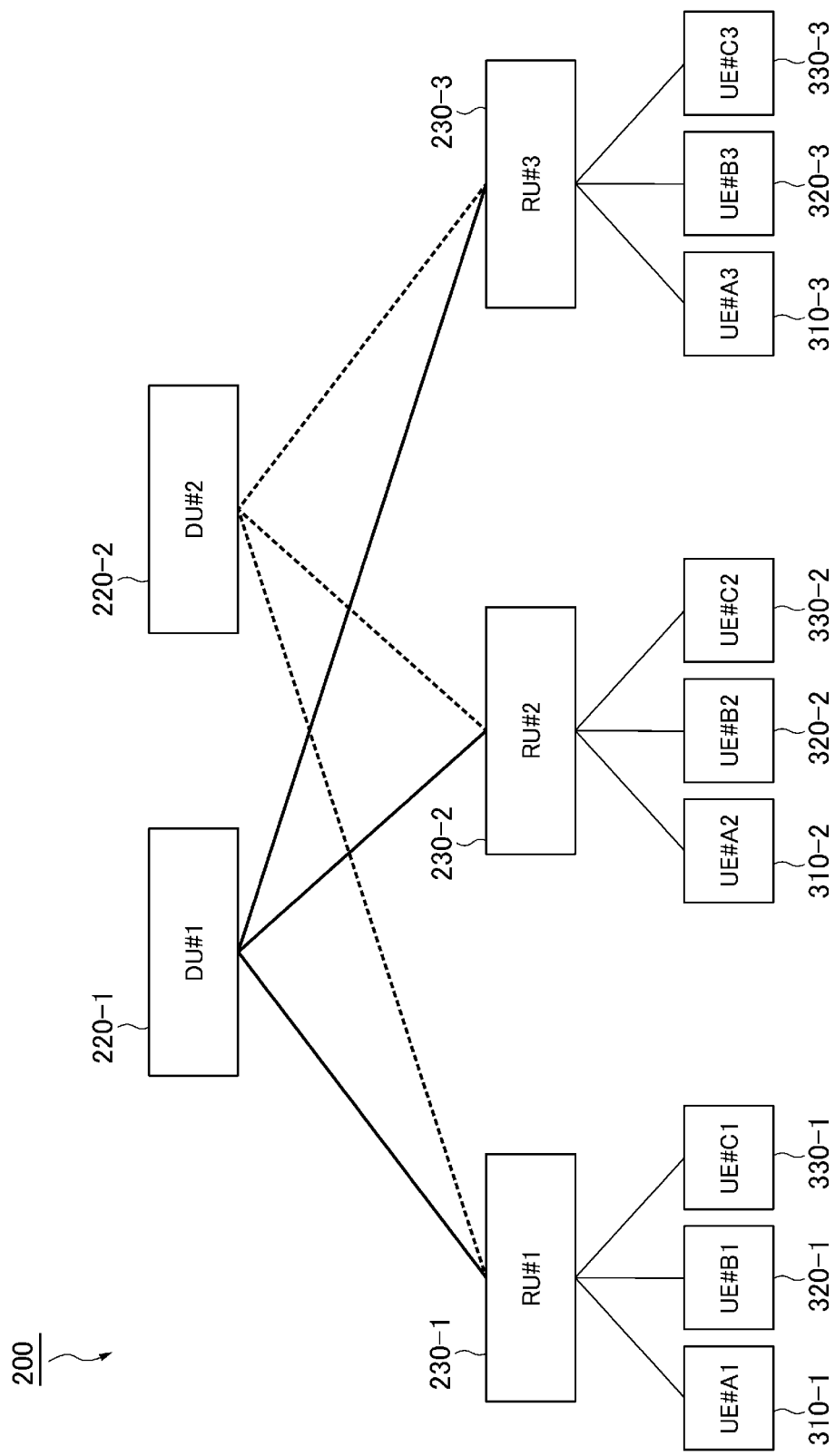
FIG. 4 is a diagram illustrating an example of a management apparatus and a RAN to which a management method is applied, according to one or more embodiments.

FIG. 4 is a diagram illustrating an example of RAN 200 to which a management apparatus and a management method according to one or more embodiments is applied.

The illustration of a CU is omitted in FIG. 4. The RAN 200 has a DU #1 and a DU #2. The DU #1 has an RU #1, an RU #2, and an RU #3 communicably connected thereto. In addition, the DU #2 also has the RU #1, the RU #2, and the RU #3 communicably connected thereto.

A case in which there are two DUs and three RUs is merely one example, and there may be two or more DUs and there may be one or more RUs.

Two DUs are communicably connected to one RU. A Hierarchical Model of the O-RAN manages one RU with one or more DUs.

The RAN 200 is shared by one or more operators (providers). The RAN 200 may be a GWCN configuration or a MOCN configuration.

The connections of the UEs are as follows in FIG. 4.

A UE #A1, a UE #B1, and a UE #C1 are connected to an RU #1 and can receive communication services (see reference numbers 310-1, 320-1, and 330-1 in FIG. 4).

A UE #A2, a UE #B2, and a UE #C2 are connected to an RU #2 and can receive communication services (see reference numbers 310-2, 320-2, and 330-2 in FIG. 4).

A UE #A3, a UE #B3, and a UE #C3 are connected to an RU #3 and can receive communication services (see reference numbers 310-3, 320-3, and 330-3 in FIG. 4).

Each RU each being connected to three UEs is merely one example, and each RU can have any number of UEs connected thereto and there may be an RU with no UEs connected thereto.

In the example of FIG. 4, the number of operators K is 3, and a first operator may be a guarantee type Company A, a second operator may be a guarantee type Company B, and a third operator may be a best-effort type Company C.

That is, in FIG. 4, the UE #A1, the UE #A2, and the UE #A3 are guarantee type UEs that have entered into agreement with Company A.

The UE #B1, the UE #B2, and the UE #B3 are guarantee type UEs that have entered into agreement with Company B.

The UE #C1, the UE #C2, and the UE #C3 are best-effort type UEs that have entered into agreement with Company C.

This configuration in FIG. 4 was made for simplicity of explanation. For example, there may be cases where the third operator also provides guarantee type communication services to the users. Moreover, there may be cases where the operators provide communication services by having each user select the guarantee type or the best-effort type. The present disclosure may be applied to other more general cases, provided that the necessary changes are also made to interpretations.

The RU #1, the RU #2, and the RU #3 are each communicably connected to (have a session established with) both the DU #1 and the DU #2.

Only the DU #1 is used for communication with the best-effort type UEs. For example, data to the RU #C1 for the best-effort type UE #C1 is transmitted from the CU via the DU #1 and not the DU #2.

Moreover, when the processing capacity of the DU #1 has not decreased (referred to as a "Normal Time" of the DU #1), only the DU #1 is also used to communicate with the guarantee type UE #A2 and UE #B2. For example, the data to the RU #2 for the guarantee type UE #A2 is transmitted from the CU via the DU #1 and not the DU #2 in Normal Time.

In other words, the DU #1 is a DU that is shared by one or more operators and that processes not only guarantee type UE data but also best-effort type UE data. If the amount of data to be processed at the DU #1 increases (communication congestion occurs), the processing capacity of the DU #1 decreases, and the guarantee type SLA of each company may not be able to be fulfilled.

In addition to FIG. 4, with reference to FIGS. 5 and 6, an example of processing distribution of a DU according to one or more embodiments will be described in more detail.

In the situation of FIG. 4, suppose that the data (data 932 in FIG. 5) is processed from the CU via the DU #1 for the UE #A2, the UE #B2, and the UE #C2 connecting in the RU #2.

When the processing capacity of the DU #1 decreases and securing the lower limit of the throughput of the UE #A2 or the UE #B2 is difficult, processing distribution of Company A is performed first among the guarantee type Company A and Company B. That is, at least a portion of data processing at the DU #1 for the guarantee type UE #A2 is performed at the DU #2. As shown in FIG. 5, among the data 932, at least a portion of the data for the UE #A2 is processed in the DU #2 instead of the DU #1 and transmitted to the RU #2.

As a result thereof, the lower limit of the throughput for the guarantee type UE #A2 can be secured. In addition, the traffic of Company A becomes normal. Generally, the first operator (Company A) will be able to fulfill the Service Level Agreements.

Moreover, the load of the DU #1 is reduced by processing distribution of the data for the UE #A2 to the DU #2, thereby recovering the processing capacity of the DU #1. As a result thereof, even if the processing distribution of the data for the UE #B2 is not performed, the traffic of Company B may return to normal and the lower limit of the throughput for the guarantee type UE #B2 may be secured. In such cases, the procedure of the processing distribution for the SLA can be terminated here.

For example, if the amount of the traffic of the second operator (Company B) reaches a value in a predetermined range, it may be determined that the traffic of Company B has returned to normal. Moreover, if the traffic of Company B returns to normal, it can be determined that the lower limit of the throughput for the UE #B2 is secured.

Next, a case is described in which even if processing distribution of the data for the UE #A2 to the DU #2 is performed, the amount of traffic of the second operator (Company B) does not reach the value in the predetermined range and the traffic of Company B does not return to normal. In such cases, it is considered that the lower limit of the throughput for the guarantee type UE #B2 cannot be secured.

Figure 6:
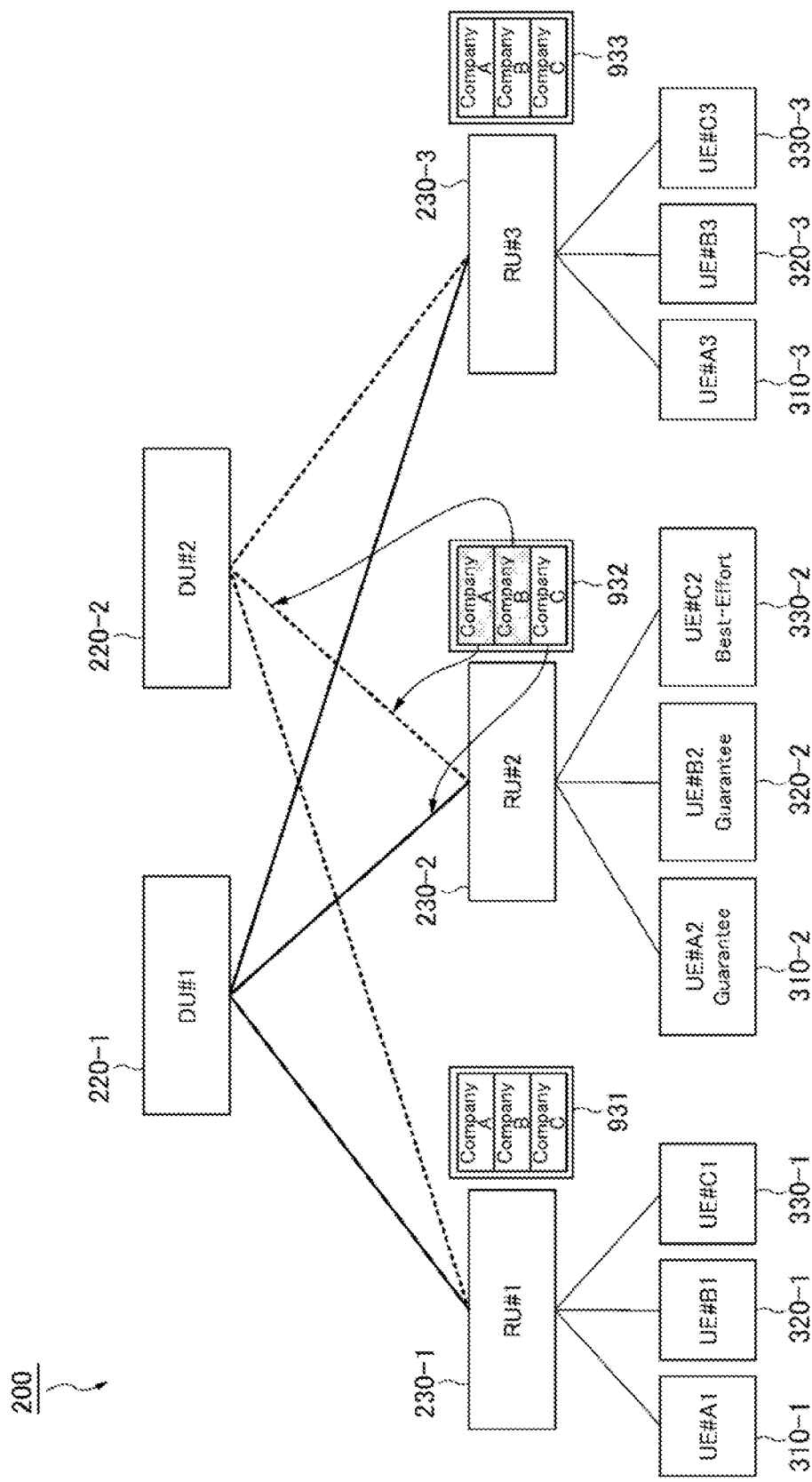
FIG. 6 is a schematic diagram illustrating a further example of a processing distribution of a DU according to one or more embodiments.

As shown in FIG. 6, among the data 932, at least a portion of the data for the UE #B2 is also processed in the DU #2 instead of the DU #1 and transmitted to the RU #2.

As a result thereof, the lower limit of the throughput for the guarantee type UE #B2 can be secured. In addition, the traffic of Company B becomes normal. Generally, the second operator (Company B) will be able to fulfill the Service Level Agreements.

In FIG. 4, the guarantee type UEs connected to the RU #2 includes not only the UE #A2 but also the UE #B2. Accordingly, which of the Company A data and the Company B data (the UE #A2 or the UE #B2) is distributed and processed first in the DU #2 may be determined, for example, according to any one of the following (a) to (e).

(a) One of Company A and Company B can be selected completely randomly, and processing distribution thereof can be performed first.

(b) One of Company A and Company B can be selected as the operator of a UE, among the UE #A2 and the UE #B2, to which a larger amount of data is transmitted, and processing distribution thereof can be performed first.

(c) One of Company A and Company B can be selected as the operator of a UE, among the UE #A2 and the UE #B2, that connects to the RU #2 earlier in time, and processing distribution thereof can be performed first.

(d) One of Company A and Company B can be selected as the operator of a UE, among the UE #A2 and the UE #B2, that connects to the RU #2 later in time, and processing distribution thereof can be performed first.

(e) An order is established for the operators, and processing distribution can be performed first for the operator of Company A and Company B that should be prioritized. For example, when RUs and DUs are owned by Company A and shared with Company B and Company C, data for a UE that has entered into an agreement with Company A, which is the owner, may be distributed with priority.

Figure 5:
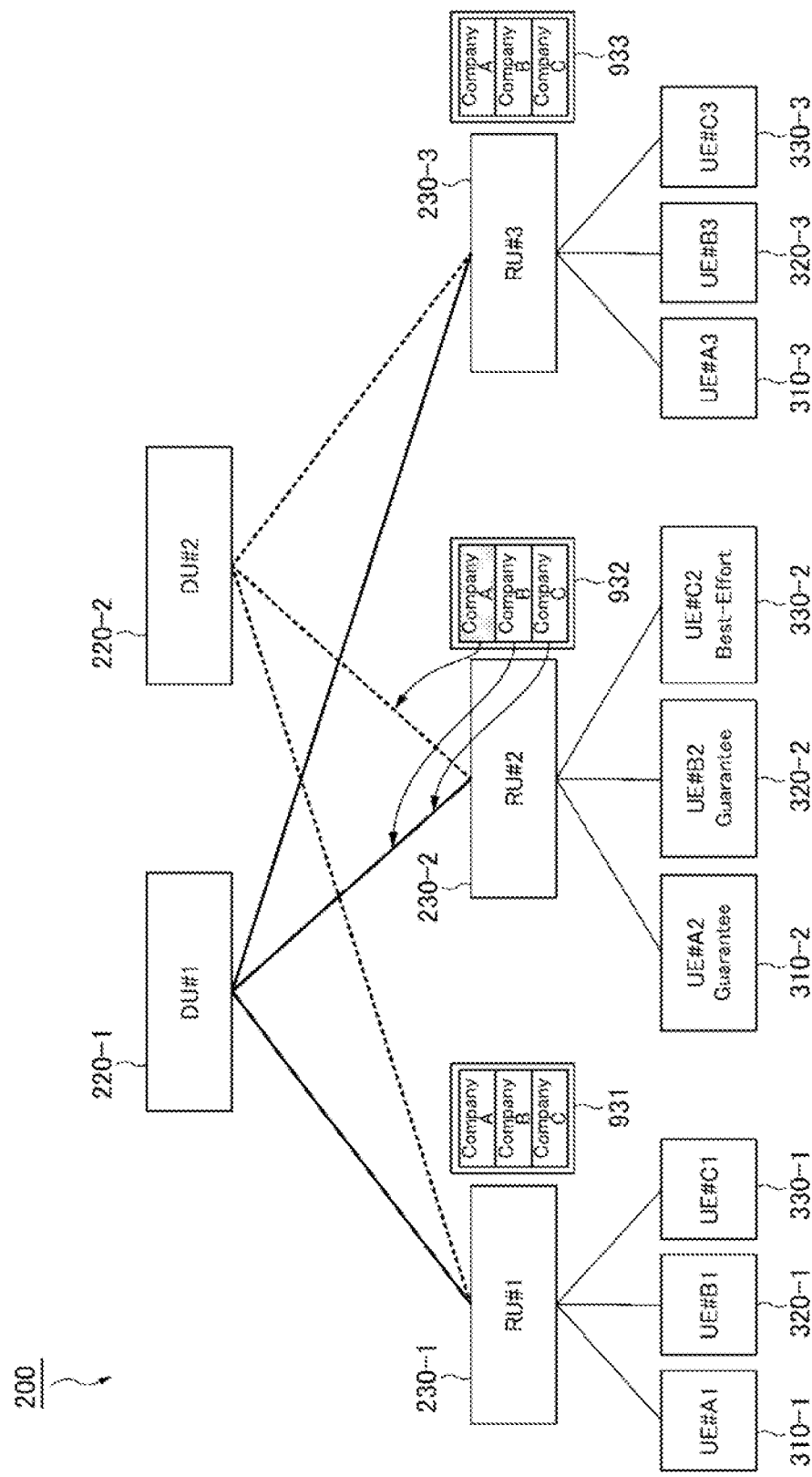
FIG. 5 is a schematic diagram illustrating an example of a processing distribution of a DU according to one or more embodiments.

In FIG. 5, it may be supposed that distributing processing of the data for the UE #A2 (Company A) first, for example, was determined by any one of these (a) to (e).

The DU #2 for fulfilling the guarantee type SLA holds sufficient processing resources.

However, when multiple operators have entered into guarantee type SLAs with those UEs, the processing resources of the DU #2 may be insufficient.

For example, an operator that owns the DU #2 may only provide resources for fulfilling the guarantee type SLAs of its own UE to the DU #2.

In particular, the DU #2 may run out of resources when processing of data for a guarantee type UE of one operator is transferred to the DU #2 and processing of data for a guarantee type UE of another operator is also transferred to the DU #2.

In order to resolve such lack of resources, resources of the DU #1 for best-effort type UEs may be transferred to the DU #2. When the functions of the DU #1 and the DU #2 are configured by virtualization on the same virtual infrastructure, the resources of the DU #1 can be transferred to the DU #2 more easily. Since the DU #1 primarily performs processing for the best-effort type UEs, reduction of resources is not a problem in terms of fulfilling SLAs.

Among data for the guarantee type UE #A2 or UE #B2, determining a portion of the processing to be transferred from the DU #1 to the DU #2 is described below. The procedure for transferring the processing of the determined portion from the DU #1 to the DU #2 will be described later.

Note that regarding determining the portion of processing to be transferred from the DU #1 to the DU #2, it is also possible to combine different methods in the UE #A2 and the UE #B2.

(Processing Distribution According to Data Type)

Figure 7:
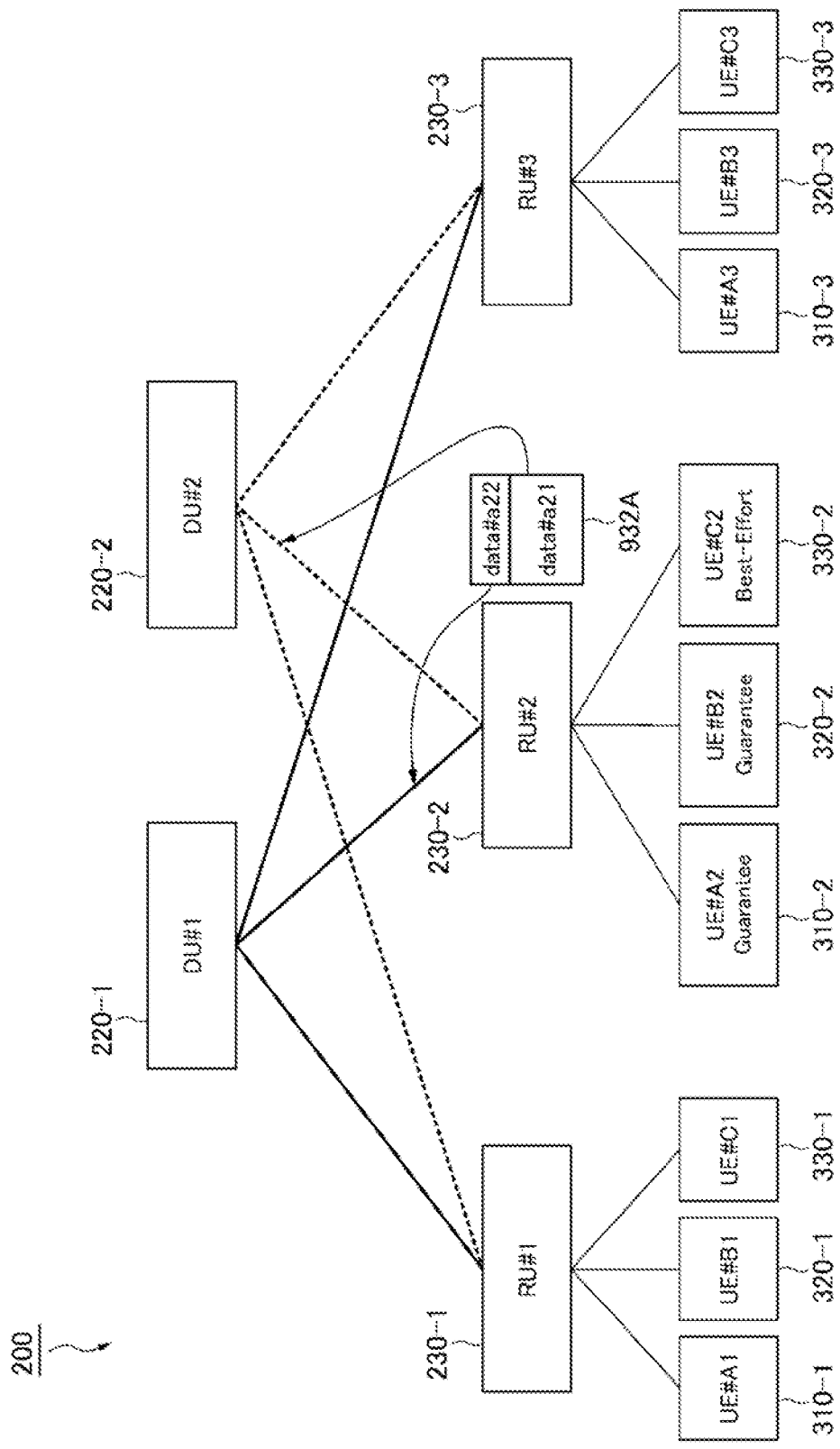
FIG. 7 is a schematic diagram illustrating an example of data subject to distribution according to one or more embodiments.

FIG. 7 is a schematic diagram illustrating an example of data subject to distribution (subject to transferring of processing at one DU to another DU) according to one or more embodiments.

Referring to FIG. 7, an example of distributing processing at a DU according to a type of contents will be described. The connections between the DU #1/DU #2 and the RU #1/RU #2/RU #3 in FIG. 7 are the same as in FIG. 4, so a description thereof will be omitted.

Moreover, the numbers of the DUs, the RUs, guarantee type UEs, and best-effort type UEs are not limited to those illustrated in FIG. 7, and there is no particular limitation on the number thereof. In particular, regarding the UEs, any number of UEs may be connected to one RU. In addition, there may also be RUs that have no UEs connect thereto.

As shown in FIG. 4, the guarantee type UE #A2 and UE #B2 are connected to the RU #2. The UE #A2 in FIG. 7 will be described since there is no difference between the UE #A2 and the UE #B2 in determining the portion of processing to be transferred from the DU #1 to the DU #2.

Data processed for the UE #A2 in the RU #2 is data 932A. The data 932A is a portion of the data 932 of FIG. 5 (the data for the UE #A2).

Among the data 932A for the guarantee type UE #A2, the portion of the processing that is to be transferred from the DU #1 to the DU #2 can be determined by the type (category) of data to be processed. As a result thereof, it may be possible to fulfill the SLAs with data units that are categorized into types.

The data 932A for the guarantee type UE #A2 in the RU #2 comprises first data (shown as data #a21 in FIG. 7) and second data (shown as data #a22 in FIG. 7), which can be categorized by type. The types of the first data and the second data are a first type and a second type, which are distinguishable from each other.

For the data 932A for the guarantee type UE #A2, the processing of the first data is transferred to the DU #2. The second data is processed at the DU #1.

The types of data may be stored in a database. In particular, the types of data may be stored in the storage 126 of the management apparatus 100 in FIG. 1. A type of a data for which processing is to be distributed may be determined by machine learning from past trends of the users or the UEs. In addition, data placed in the MEC may be a type of data that is to be processed at the DU #2.

In particular, the type of data used in determining whether or not to distribute processing can be determined for each application. As a result thereof, it may be possible to fulfill SLAs for each application.

In other words, communication services are classified according to the applications in the UEs, and the type used to judge whether or not to distribute processing for data (content) handled by each application is determined. The type used to determine whether or not to distribute processing can be determined based on priority.

The priority or the type of data (content) for each application may be stored in the database. In particular, the priority or the type of data (content) may be stored in the storage 126 of the management apparatus 100 in FIG. 1.

For example, movies and advertising videos are played on a video viewing application of the UE. For this reason, the movies and the advertising videos are related to the same application.

Suppose that the movies have a high priority for processing and the advertising videos have a low priority for processing. Processing of the movie data (data #a21 in FIG. 7) is distributed to the DU #2 and the advertising video data (data #a22 in FIG. 7) is processed at the DU #1.

(Processing Distribution of Resource Blocks)

Figure 8:
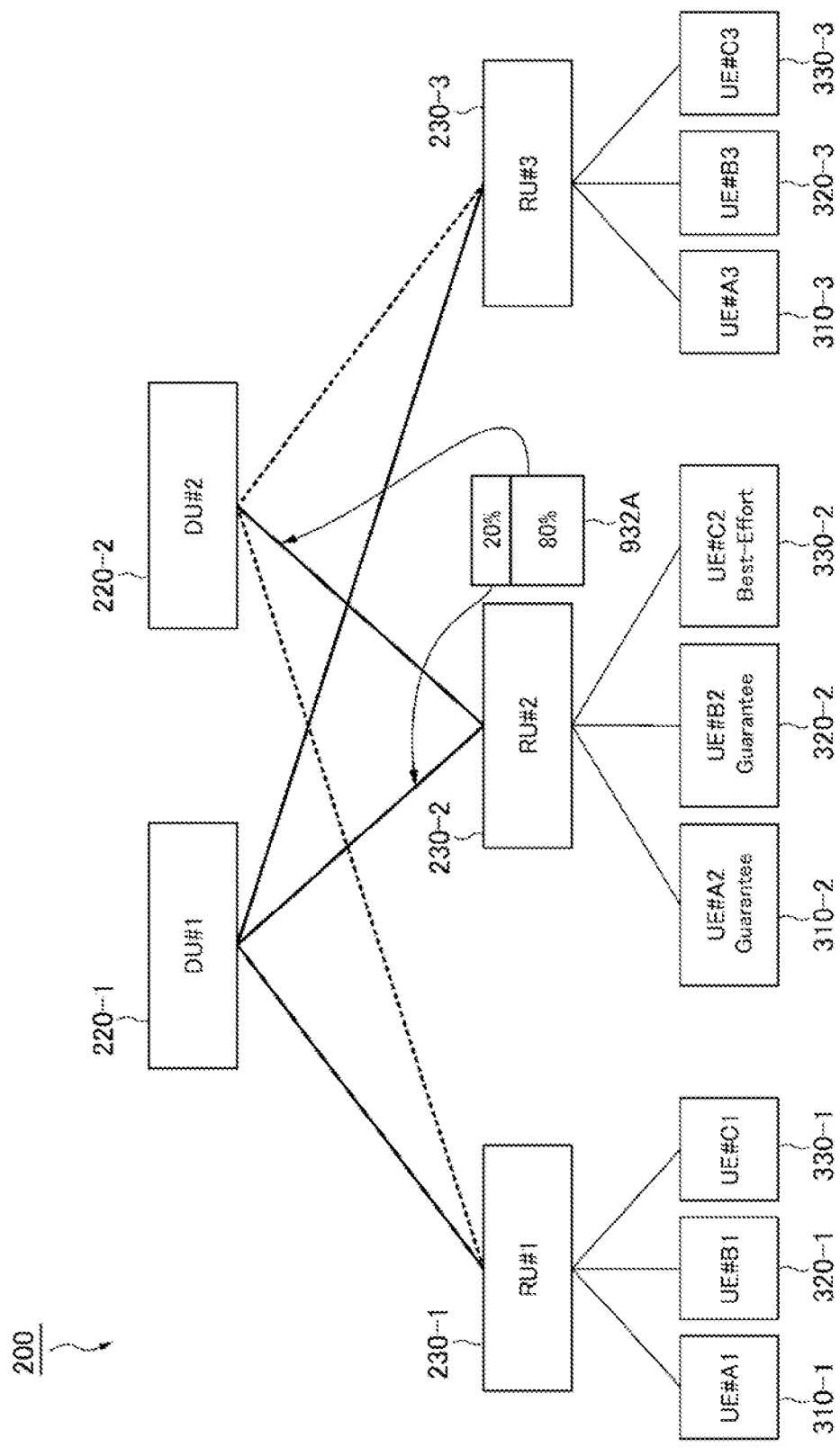
FIG. 8 is a schematic diagram illustrating another example of data subject to distribution according to one or more embodiments.

FIG. 8 is a schematic diagram illustrating another example of a processing distribution of a DU according to one or more embodiments.

Referring to FIG. 8, an example of distributing processing at the DU separately for each resource block will be described. The connections between the DU #1/DU #2 and the RU #1/RU #2/RU #3 in FIG. 8 are the same as in FIG. 4, so a description thereof will be omitted.

Moreover, the number of the DUs, the RUs, guarantee type UEs, and best-effort type UEs are not limited to those illustrated in FIG. 8, and there is no particular limitation on the number thereof. In particular, regarding the UEs, any number of UEs may be connected to one RU. In addition, there may also be RUs that have no UEs connected thereto.

Similar to FIG. 7, there is no difference between the UE #A2 and the UE #B2 in determining the portion of processing to be transferred from the DU #1 to the DU #2. FIG. 8 describes UE #A2. Data processed for the UE #A2 in the RU #2 is data 932A.

The portion to be transferred to the DU #2 among the processing for the guarantee type UE #A2 at the DU #1 is a fixed percentage portion of the data 932A to be processed.

In FIG. 8, for the guarantee type UE #A2 in the RU #2, for example, 80% of the processing of the data 932A is distributed to the DU #2. The remaining 20% of the processing of the data 932A is performed at the DU #1.

Thus, the lower limit of the throughput for the UE #A2 can be secured while considering the specific amount of the data.

Selecting a portion of a fixed percentage of data to be processed, which should be transferred to the DU #2, among the processing for the guarantee type UE #A2 in the DU #1 can be performed in resource block units.

In other words, in order to reduce the load on the DU #1, the resource blocks that the DU #1 emits radio waves from the RU #2 are reduced, and the reduced resource blocks are compensated by the DU #2.

Figure 9:
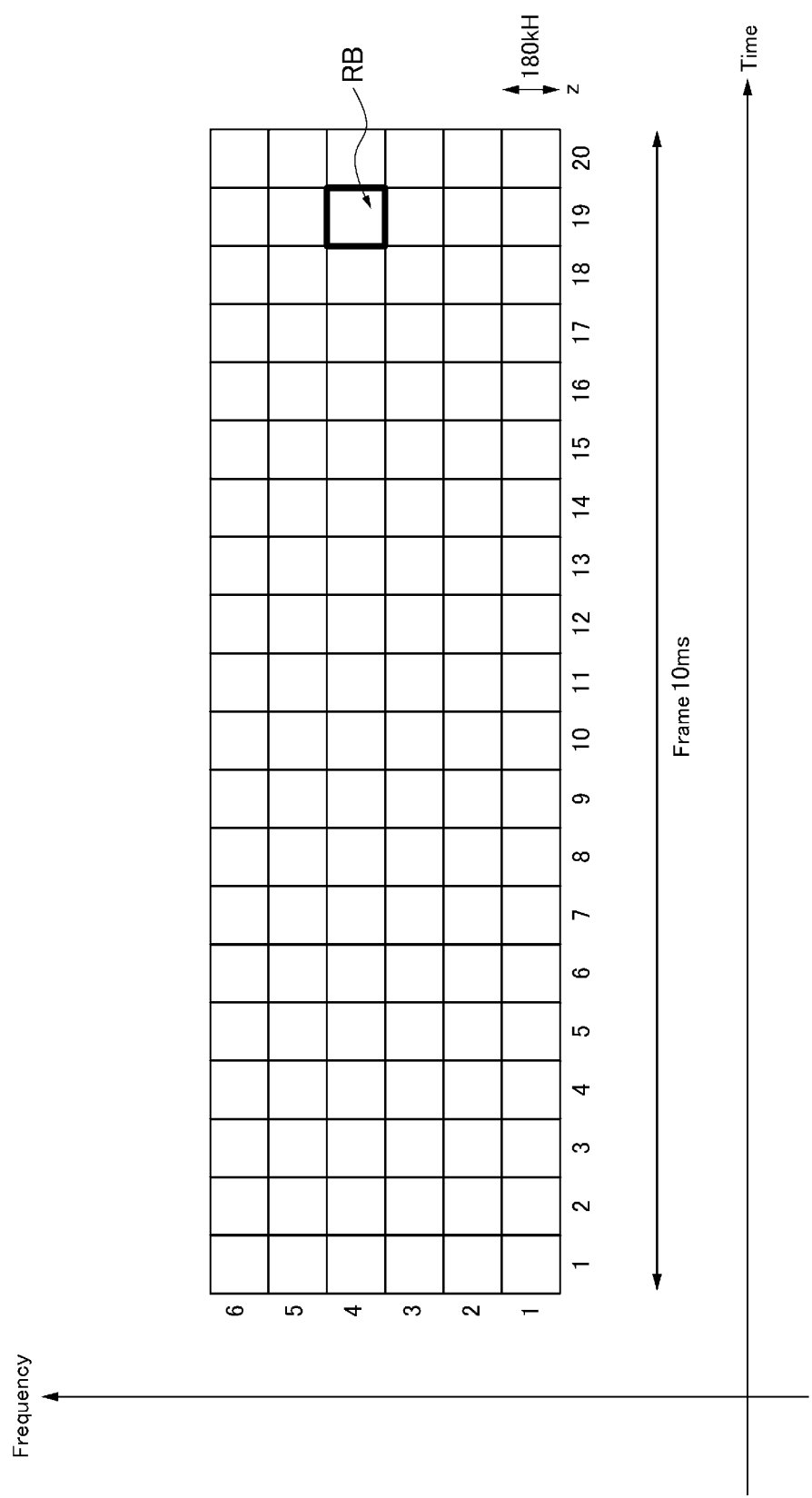
FIG. 9 is a diagram illustrating an example of a resource grid and resource blocks.

FIG. 9 illustrates an example of a resource grid and resource blocks, according to one or more embodiments of the present disclosure.

FIG. 9 illustrates a 20×6 resource grid for a time direction and a frequency direction, wherein unit cells of the resource grid are resource blocks. That is, the resource grid of FIG. 9 has 20×6=120 resource blocks. The number of the resource blocks is not limited to 20×6 and may be M×N (where M is an integer greater than or equal to 1 and N is an integer greater than or equal to 1).

Each resource block comprises, for example, one slot (0.5 milliseconds)×12 subcarriers (15×12=180 kHz). The configuration of the resource blocks is also not limited thereto.

In each DU, an allocation (scheduling) of a downlink to an RU in one frame is performed in two resource block units consecutive in the time direction of the resource grid.

Referring to FIG. 8, selecting a fixed percentage portion of data processing to be carried out at the DU #A2 will be discussed again.

A downlink from the DU #1 to the RU #2 in Normal Time is performed in a resource grid unit illustrated in FIG. 9. This downlink comprises data for the UE #A2.

Therefore, among the resource blocks within the resource grid, for the resource blocks for the data to the UE #A2 (for example, the resource blocks directed to the UE #A2 among the resource blocks for a Physical Downlink Shared Channel (PDSCH)), a fixed percentage (80% in the example of FIG. 8) of the resource blocks can be selected so as to be processed at the DU #2.

As a result thereof, a fixed percentage portion of the data being processed at the DU #1 (that is, a portion that should be distributed to the DU #2 for processing) can be selected.

The data to be distributed to the DU #2 for processing may be selected by dividing the band into two, for example, at an 80:20 percent ratio, in the frequency direction (that is, in the vertical axis direction in FIG. 9) in the resource grid and then selecting the resource blocks for the data to the UE #A2.

Figure 10:
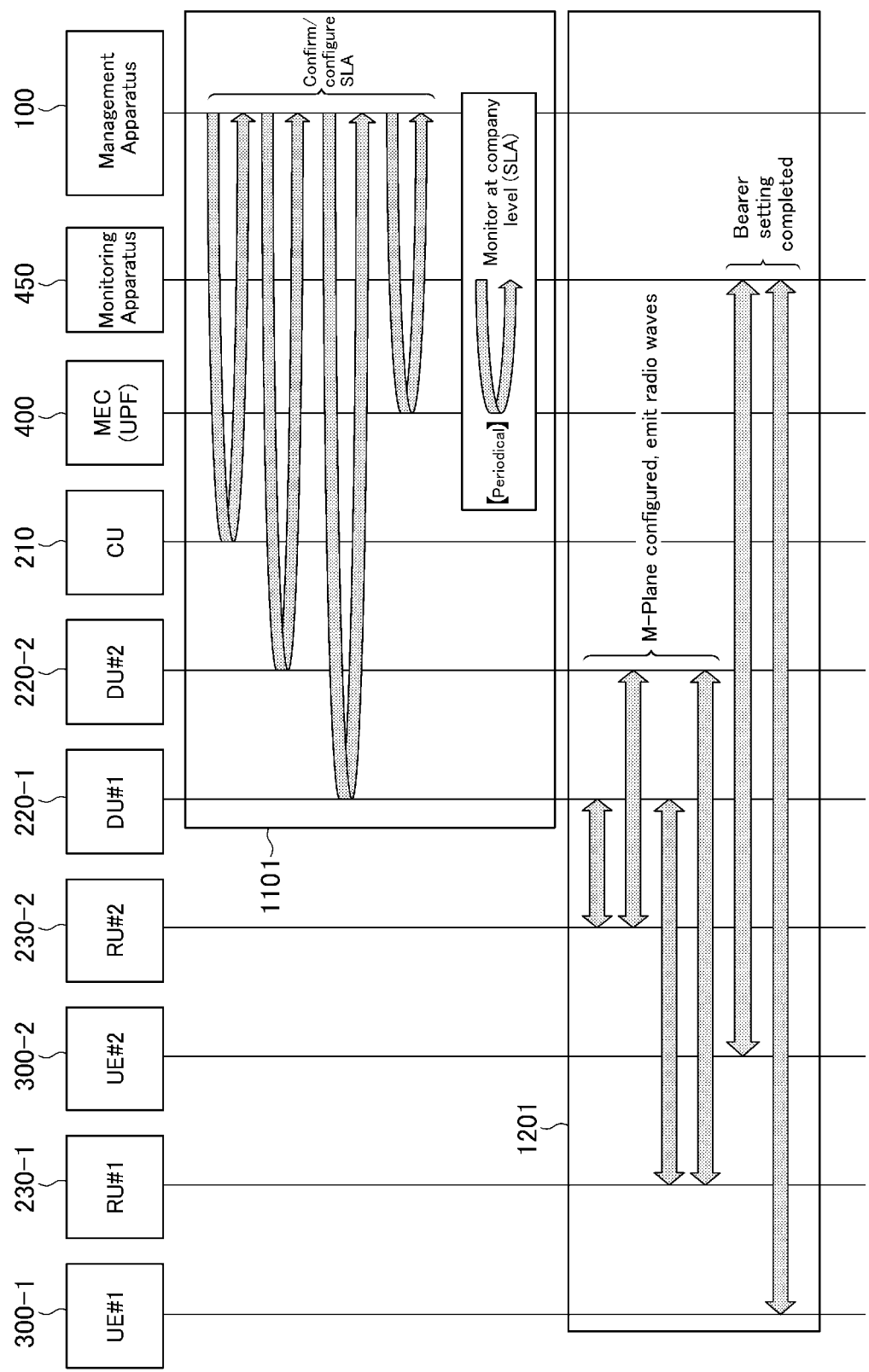
FIG. 10 is a schematic diagram for describing an example of a procedure up to a processing distribution of a DU according to one or more embodiments.

Referring to FIG. 10, an example of a procedure for a processing distribution of a DU according to one or more embodiments is described.

FIG. 10 shows a management apparatus 100, a monitoring apparatus 450, a MEC 400, a CU 210, a DU #1, a DU #2, an RU #1, an RU #2, a UE #1, and a UE #2.

In particular, the interconnections of the DU #1, the DU #2, the RU #1, and the RU #2 are the same as in FIG. 4. In addition, UE #A1, UE #B1, and UE #C1 connected to the RU #1 are collectively referred to as UE #1, and UE #A2, UE #B2, and UE #C2 connected to the RU #2 are collectively referred to as UE #2.

In FIG. 10, the descriptions of the RU #3 and the UEs connected to the RU #3 are omitted. The DU #1 and the DU #2 are communicably connected to the CU 210.

The monitoring apparatus 450 is communicably coupled to at least the MEC 400 and the management apparatus 100.

The enclosure indicated by the reference number 1101 in FIG. 10 indicates an acquisition of processing capacities of the DU #1 and the DU #2 by the management apparatus 100, an acquisition of SLAs (that is, a guarantee type or a best-effort type) of the UEs connected to the DU #1 and the DU #2, and determination or monitoring of a status of fulfillment of the SLAs (in particular, guarantee type SLAs).

Processing capacities can be represented by physical resources such as memories and computing resources such as a usage state of a processor. The processing capacities and the SLAs of the connected UEs may be acquired periodically and stored in a storage of the management apparatus 100.

Moreover, the management apparatus 100 can acquire the information regarding which RU the guarantee type UE is connected to. The management apparatus 100 may also acquire the connection status of the best-effort type UEs.

The management apparatus 100 may configure the CU 210, the DU #1, the RU #1, and the RU #2 such that processing of data directed to the best-effort type UEs and processing of data directed to the guarantee type UE at the Normal Time are performed at the DU #1.

Further, the management apparatus 100 may acquire the amount of the data being processed at each DU from the MEC 400. As a result thereof, the management apparatus 100 can monitor the amount of the data being processed at each DU.

The amount of the data being processed at each DU may be periodically acquired and stored in the storage of the management apparatus 100.

Moreover, the monitoring apparatus 450 may acquire the amount of data being processed at each DU for each operator from the MEC 400. As a result thereof, the monitoring apparatus 450 can monitor the amount of the data being processed at each DU for each operator.

This allows determination or monitoring of the status of fulfillment of the SLAs (in particular, the guarantee type SLAs) at an operator (company) level.

Figure 11:
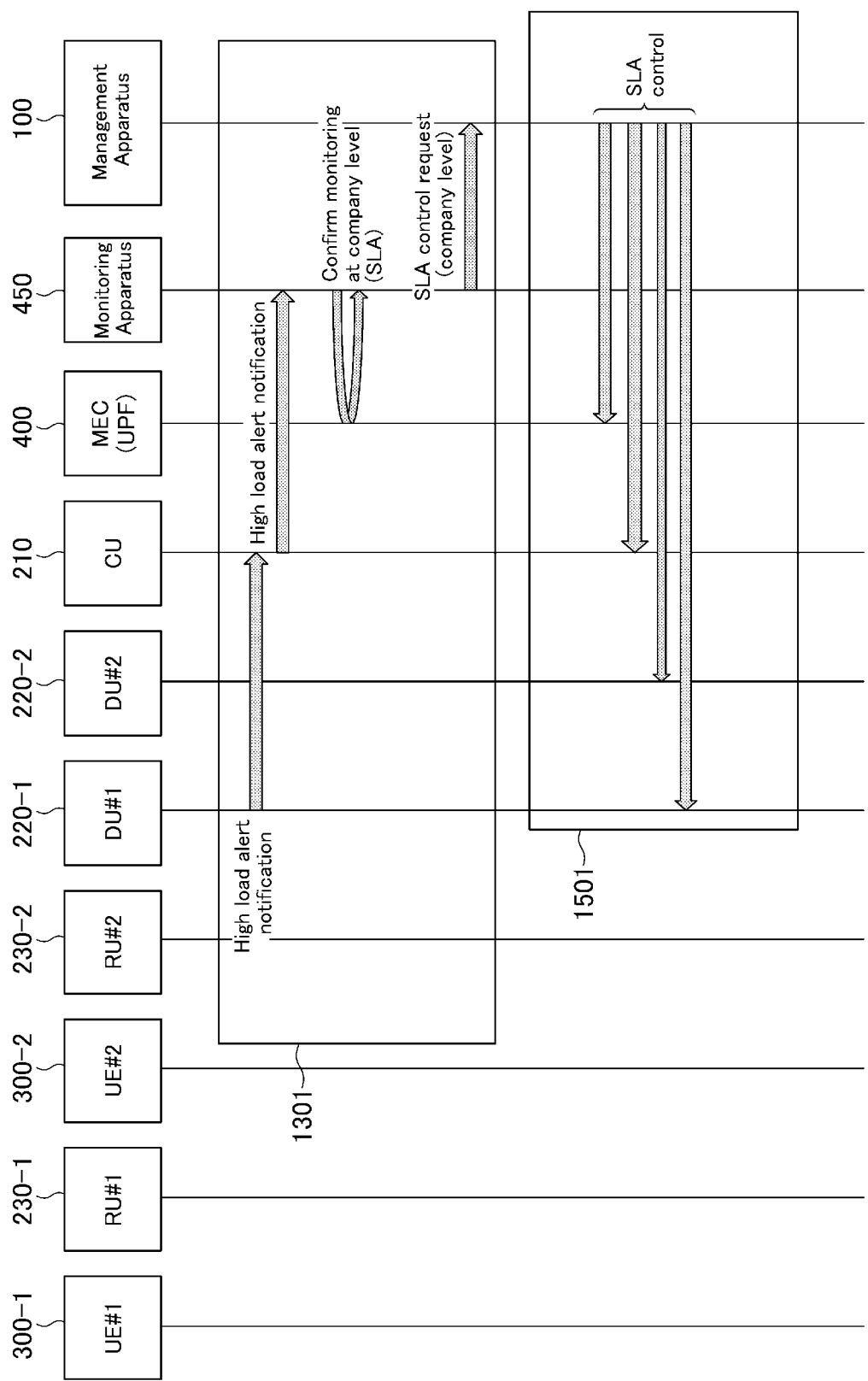
FIG. 11 is a schematic diagram for describing an example of a procedure of a processing distribution of a DU according to one or more embodiments.

When the monitoring apparatus 450 ascertains the status of fulfillment of the SLAs at the operator level and determines that processing distribution is necessary, it may notify the management apparatus 100 to initiate the processing distribution (see also the enclosure indicated by reference number 1301 of FIG. 11).

The enclosure indicated by the reference number 1201 in FIG. 10 illustrates a procedure for configuring an M-Plane (management plane) to emit radio waves. Each of the RU #1 and the RU #2 can establish a session with both the DU #1 and the DU #2 (see FIG. 4) to emit radio waves. As a result thereof, a bearer setting is completed between the UE #1 and the UE #2 connected to the RU #1 and the RU #2, respectively, and the MEC 400.

Referring to FIG. 11, an example of a procedure for a processing distribution of a DU according to one or more embodiments is described.

FIG. 11 also shows a management apparatus 100, a MEC 400, a CU 210, a DU #1, a DU #2, an RU #1, an RU #2, a UE #1, and a UE #2.

The management apparatus 100 controls the processing distribution of the DUs. Triggers that cause the management apparatus 100 to initiate processing distribution of the DUs are a first trigger, a second trigger, and a third trigger indicated below (see the enclosure indicated by the reference number 1301 in FIG. 11).

The first trigger indicates that the DU #1 is highly loaded. A highly loaded state of the DU #1 indicates, for example, that among resources of the DU #1, the percentage of the portion of the resources used for processing (referred to as "resource usage rate") exceeds a predetermined first threshold.

The first trigger can provide a notification of a high load alert of the DU #1 to the CU 210 and further provide the notification to the monitoring apparatus 450.

The second trigger indicates an increase in traffic. The increase in traffic indicates, for example, that the amount of traffic being monitored in the RAN exceeds a predetermined second threshold.

The second trigger is acquired (confirmed) by the monitoring apparatus 450 that monitors traffic for each operator (i.e., on a company level).

The third trigger corresponds to the monitoring apparatus 450 having both the first trigger and the second trigger being applied (so-called "AND" processing) or one of the first trigger and the second trigger being applied (so-called "OR" processing).

In particular, initiating processing distribution when both the first trigger and the second trigger are applied can avoid incorrect determination due to a temporary high load or traffic increase due to, for example, deletion of virtualized DUs.

Processing distribution of the DU by the management apparatus 100 can be initiated when the third trigger is applied from the monitoring apparatus 450. That is, the monitoring apparatus 450 will request the management apparatus 100 to distribute the processing of the DU in order to fulfill the SLA (in particular, the guarantee type SLA) at the company level (for each operator), The management apparatus 100 may optionally further notify the DU #1 of the amount and the type of the data for the guarantee type UEs prior to transmission thereof. As a result thereof, the management apparatus 100 can inquire whether or not processing data for the guarantee type UE at the DU #1 will cause the processing capacity of the DU #1 to become lower than in Normal Time.

Even when the third trigger is applied, if the processing capacity of the DU #1 does not decrease than in Normal Time although the processing is performed at the DU #1, processing distribution can be canceled.

As a result thereof, processing distribution can be initiated only when the processing distribution is confirmed to be necessary in view of the data to be transmitted.

When there are multiple operators for which processing distribution should be performed in order to fulfill the SLAs, companies are selected one by one from among the operators for processing distribution.

Processing distribution of the DU by the management apparatus 100 includes the following operations (see the enclosure indicated by the reference number 1501 in FIG. 11).

The management apparatus 100 notifies the DU #1 of the data to be processed at the DU #1 among the data processing for the guarantee type UEs.

The management apparatus 100 notifies the DU #2 of the data to be processed at the DU #2 among the data processing for the guarantee type UEs.

The management apparatus 100 instructs the CU 210 to transmit the data to be processed at the DU #2 among the data for the guarantee type UEs to the DU #2 instead of the DU #1.

The management apparatus 100 notifies the MEC 400 that instructions for distributing processing to the DU #1, the DU #2, and the CU 210 have been completed.

The management apparatus 100 also instructs the MEC 400 to monitor whether or not the traffic of the data related to the application has returned to normal.

Whether or not to distribute processing for further guarantee type operators can be determined based on whether or not the amount of traffic is within a predetermined range.

Figure 12:
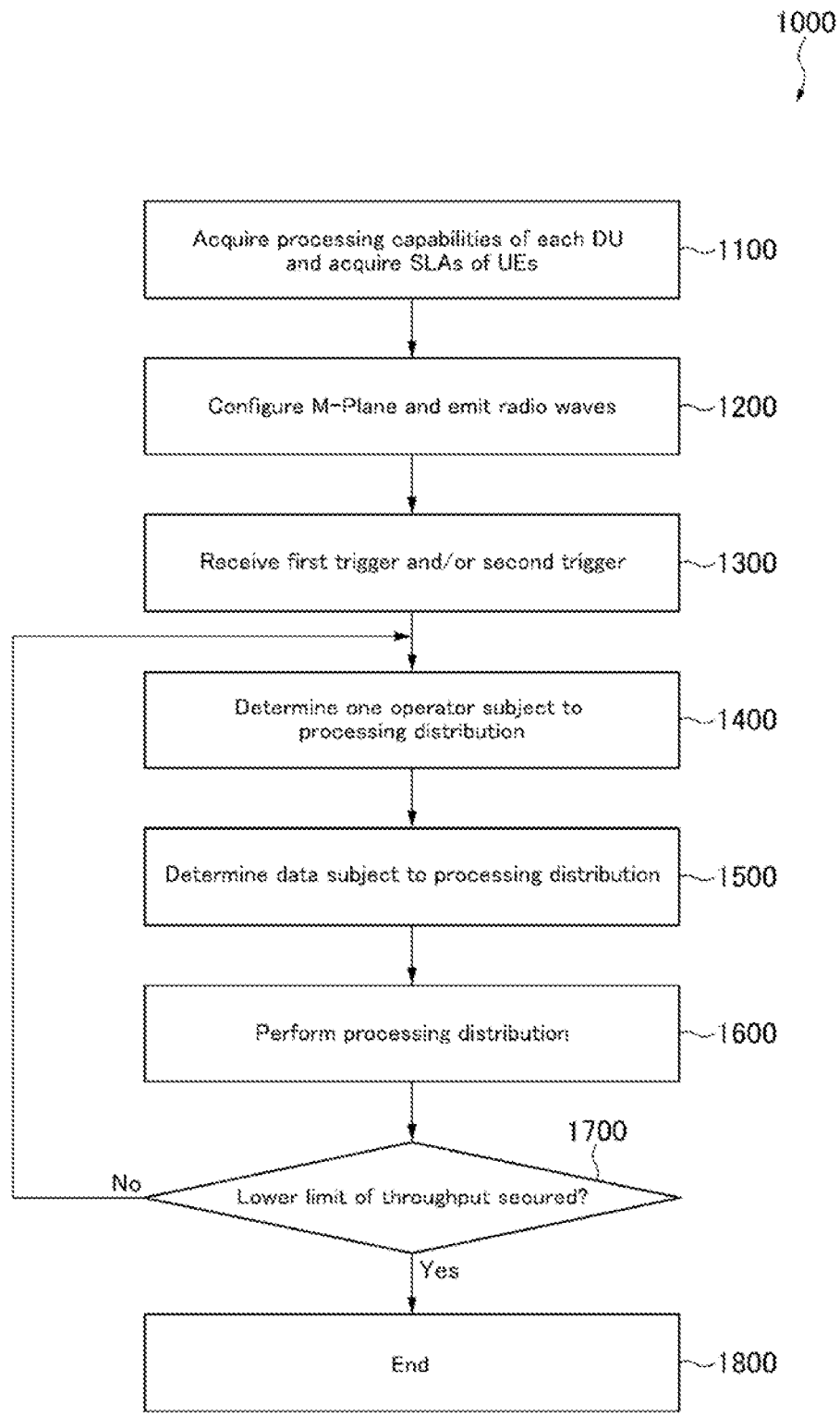
FIG. 12 is a flow chart illustrating an example of a management method of a RAN according to one or more embodiments.

FIG. 12 is a flowchart illustrating an example of a RAN management method 1000 executed by one or more processors according to one or more embodiments.

The management method 1000 is a RAN control method in which one or more RUs are communicably connected to a first DU (DU #1) and a second DU (#2).

At Normal Time, the first DU processes data for the one or more RUs. When the processing capacity of the first DU decreases, a portion of data processing for a guarantee type UE at the first DU is transferred to the second DU, thereby providing a method of distributing data processing.

It should be noted that there are guaranteed type UEs for multiple operators, and data processing for these operators is at Normal Time performed at the first DU.

The present method is anticipated to be executed in the management apparatus 100, but a portion of the processing may be executed by a different apparatus than the management apparatus 100. That is, the present method may be performed with processing distribution by a plurality of devices.

In the management method 1000, processing capabilities of a CU and each DU to each RU, and SLAs of UEs connected thereto (that is, a guarantee type or a best-effort type) are acquired (reference number 1100 in FIG. 12). Note that this step may be repeated periodically. Moreover, information regarding which RU the guarantee type UE is connected to can be acquired.

In addition, for the CU and each DU, processing of data directed to the best-effort type UE and processing of data directed to the guarantee type UE at Normal Time can be configured so as to be performed at the DU #1.

Furthermore, the amount of data being processed at each DU may be acquired from a management apparatus for each operator using the data. As a result thereof, the amount of the data being processed at each DU can be monitored for each operator.

Next, a M-Plane is configured to emit radio waves from the RUs (reference number 1200 in FIG. 12). The RUs can establish sessions with the DU #1 and the DU #2 to emit radio waves. In Normal Time, RUs are configured to emit radio waves for the data processed at the DU #1.

Next, processing distribution of the DU is initiated upon receiving at least one of a first trigger and a second trigger (reference number 1300 in FIG. 12).

The first trigger is a trigger that gives an alert when the DU #1 is highly loaded. In particular, an alert may be given when a resource usage rate of the DU #1 exceeds a predetermined first threshold.

The second trigger is a trigger in which notification of increase in traffic is provided at a company level (for each operator). In particular, a notification of an increase in traffic may be provided when the amount of traffic being monitored exceeds a predetermined second threshold.

Processing distribution of the DU may be initiated when either one of the first trigger or the second trigger is applied. Alternatively, processing distribution of the DU may be initiated when both of the first trigger and the second trigger are applied.

Next, among data for the guarantee type UE, data to be processed at the DU #2 is determined.

There are multiple guarantee type UEs for multiple operators. Among the operators that have entered into guarantee type SLAs with users, one operator which is subject to processing distribution and for which processing distribution has not been performed is determined (reference number 1400 in FIG. 12).

This determination can be performed by randomly selecting an operator, among multiple operators, for which processing distribution has not been performed.

Alternatively, an operator of a UE to which a large amount of data is transmitted can be determined.

Alternatively, an operator of a UE that has connected to the RU earlier or a UE that has connected to the RU later can be determined.

Alternatively, an operator can be determined according to an operator priority order.

Next, among data for a UE of one operator determined to be subject to processing distribution, the specific data that should be subject to processing distribution is determined (reference number 1500 of FIG. 12).

This determination can be made based on the type of the data for the guarantee type UE. In particular, this determination can be made based on the priority level of data for each application.

Alternatively, the data distributed to the DU #2 and to be processed at the DU #2 can be determined to be a fixed percentage of the data for the guarantee type UE.

In particular, this determination can be made based on the number of resource blocks for transmitting data for the guarantee type UE.

Alternatively, this determination can be made by using a fixed percentage of bandwidth within a bandwidth that transmits data for the guarantee type UE.

Next, processing distribution is performed (reference number 1600 in FIG. 12).

That is, among the data for the guarantee type UE, the data (or the portion of the data) determined to be processed at the DU #2 is processed at the DU #2.

Moreover, among the data for the guarantee type UE, data (or a portion of data) other than the data (or the portion of the data) determined to be processed at the DU #2 is processed at the DU #1.

Next, the processing distribution determines whether or not the lower limit of the throughput for the guarantee type UE is secured for each of the plurality of operators that have entered into guarantee type SLAs with the users (reference number 1700 in FIG. 12).

Whether or not the lower limit of the throughput is secured may be monitored by the MEC monitoring whether or not the traffic for each operator is normal. If the amount of traffic for each operator is within a predetermined range, it may be determined to be normal.

That is, when the lower limit of the throughput is secured for the plurality of operators that have entered into guarantee type SLAs with users and the SLAs can be fulfilled, processing distribution does not need to be performed for all the operators.

In such cases (Yes in reference number 1700 in FIG. 12), the procedure of the processing distribution for the SLAs can be terminated here (reference number 1800 in FIG. 12).

For the plurality of operators that have entered into guarantee type SLAs with users, there may be operators in a status where the lower limit of the throughput is not secured, and the SLA cannot be fulfilled.

In such cases (No in reference number 1700 in FIG. 12), among the operators that have entered into guarantee type SLAs with users, one operator which is subject to processing distribution and for which processing distribution has not been performed is determined again (reference number 1400 in FIG. 12).

Determination of the data which is subject to processing distribution and execution of the processing distribution (reference numbers 1500 and 1600 in FIG. 12) are repeated until the lower limit of the throughput is secured for all operators that have entered into guarantee type SLAs with the users (reference numbers 1700 and 1800 in FIG. 12).

Note that the flowchart described above is merely one example, and the order of processing can be changed as appropriate as long as a desired result can be obtained.

The present disclosure also includes a program for causing one or more processors to perform the management methods described above. The program may be stored and provided in a computer-readable non-transitory storage medium.

The program may be stored in a volatile or a non-volatile memory 124 in a processing device 120 of the management apparatus 100 in FIG. 1 in order to operate the processor 122.

Further, the present disclosure is not limited to the embodiments discussed above and includes various modified examples in which components have been added, removed, or replaced with respect to the configurations discussed above. In addition, the embodiments may be combined in various ways.

The term "connection" used in the present description refers to a logical connection for the purpose of communication. For example, "an RU connected to a DU" means that the DU and the RU are logically connected such that communication therebetween is possible. There is no need for the DU and the RU to be directly connected in a physical manner by means of physical cables or the like, and the DU and the RU may be connected via multiple devices or by radio communication.

Further, the present disclosure includes the following aspects.

[1] A management apparatus of a Radio Access Network (RAN) that is shared by a plurality of operators,
  wherein the RAN comprises:
    a Central Unit (CU);
    a first Distributed Unit (DU) that is communicably connected to the CU;
    a second DU that is communicably connected to the CU; and
    a Radio Unit (RU) that is communicably connected to the first DU and the second DU,
  wherein the management apparatus comprises a processor that executes:
    until an amount of traffic being monitored in the RAN reaches a predetermined range,
    selecting one operator, among the plurality of operators, that has entered into a guarantee type Service Level Agreement (SLA) with a user; and
    transmitting instructions to the CU, the first DU, and the second DU to cause the second DU to process, among data to be processed at the first DU for the RU, at least a portion of the data for a User Equipment (UE) that is communicably connected to the RU and that has entered into the guarantee type SLA with the selected operator.

[2] The management apparatus of [1], wherein at least two of the plurality of operators have entered into a guarantee type SLA with a user.

[3] The management apparatus of [1] or [2], wherein the instructions are transmitted
when a resources usage rate of the first DU exceeds a predetermined first threshold, or
when an amount of traffic of each operator being monitored in the RAN exceeds a predetermined second threshold.

[4] The management apparatus of any one of [1] to [3], wherein the portion of the data processed at the second DU is determined by a type of data for the UE that has entered into a guarantee type SLA with the selected operator.

[5] The management apparatus of [4], wherein the type of the data for the UE that has entered into a guarantee type with the selected operator is defined for each application.

[6] The management apparatus of any one of [1] to [3], wherein the portion of the data processed at the second DU is a fixed percentage portion of the data for the UE that has entered into a guarantee type SLA with the selected operator.

[7] The management apparatus of [6], wherein the fixed percentage portion is selected in resource block units.

[8] A method for managing a Radio Access Network (RAN) that is shared by a plurality of operators,
wherein the RAN comprises:
a Central Unit (CU);
a first Distributed Unit (DU) that is communicably connected to the CU;
a second DU that is communicably connected to the CU; and
a Radio Unit (RU) that is communicably connected to the first DU and the second DU,
wherein the method comprises:
until an amount of traffic being monitored in the RAN reaches a predetermined range,
selecting one operator, among the plurality of operators, that has entered into a guarantee type Service Level Agreement (SLA) with a user, and
instructing the CU, the first DU, and the second DU to cause the second DU to process, among data to be processed at the first DU for the RU, at least a portion of the data for a User Equipment (UE) that is communicably connected to the RU and that has entered into the guarantee type SLA with the selected operator.

[9] A radio communication system comprising:
a Radio Access Network (RAN) that is shared by a plurality of operators, wherein the RAN comprises,
a Central Unit (CU),
a first Distributed Unit (DU) that is communicably connected to the CU,
a second DU that is communicably connected to the CU, and
a Radio Unit (RU) that is communicably connected to the first DU and the second DU; and
a management apparatus of the RAN,
wherein the management apparatus comprises a processor that executes:
until an amount of traffic being monitored in the RAN reaches a predetermined range,
selecting one operator, among the plurality of operators, that has entered into a guarantee type Service Level Agreement (SLA) with a user; and
transmitting instructions to the CU, the first DU, and the second DU to cause the second DU to process, among data to be processed at the first DU for the RU, at least a portion of the data for a User Equipment (UE) that is communicably connected to the RU and that has entered into the guarantee type SLA with the selected operator.

REFERENCE SIGNS LIST

100 Management apparatus
110 Transmission/reception unit
120 Processing device
122 Processor
124 Memory
126 Storage
200 RAN
210 CN
220, 220-1, 220-2 DU
230, 230-1, 230-2, 230-3, 230-4, 230-5, 230-6 RU
310-1, 310-2, 310-3 UE
320-1, 320-2, 320-3 UE
330-1, 330-2, 330-3 UE
400 MEC
450 Monitoring apparatus
500 CN
931, 932, 932A, 933 Data
1000 Management method

The invention claimed is:

1. A management apparatus of a Radio Access Network (RAN) that is shared by a plurality of operators, wherein the RAN comprises:
a Central Unit (CU);
a first Distributed Unit (DU) that is communicably connected to the CU;
a second DU that is communicably connected to the CU; and
a Radio Unit (RU) that is communicably connected to the first DU and the second DU,
wherein the management apparatus comprises a processor that executes:
until an amount of traffic being monitored in the RAN reaches a predetermined range,
selecting one operator, among the plurality of operators, that has entered into a guarantee type Service Level Agreement (SLA) with a user; and
transmitting instructions to the CU, the first DU, and the second DU to cause the second DU to process, among data to be processed at the first DU for the RU, at least a portion of the data for a User Equipment (UE) that is communicably connected to the RU and that has entered into the guarantee type SLA with the selected operator.

2. The management apparatus according to claim 1, wherein at least two of the plurality of operators have entered into a guarantee type SLA with the user.

3. The management apparatus according to claim 1, wherein the instructions are transmitted
when a resources usage rate of the first DU exceeds a predetermined first threshold, or
when an amount of traffic of each operator being monitored in the RAN exceeds a predetermined second threshold.

4. The management apparatus according to claim 1, wherein the portion of the data processed at the second DU is determined by a type of data for the UE that has entered into the guarantee type SLA with the selected operator.

5. The management apparatus according to claim 4, wherein the type of the data for the UE that has entered into the guarantee type SLA with the selected operator is defined for each application.

6. The management apparatus according to claim 1, wherein the portion of the data processed at the second DU is a fixed percentage portion of the data for the UE that has entered into the guarantee type SLA with the selected operator.

7. The management apparatus according to claim 6, wherein the fixed percentage portion is selected in resource block units.

8. A method for managing a Radio Access Network (RAN) that is shared by a plurality of operators, the method comprising:
providing the RAN, wherein the RAN comprises:
a Central Unit (CU),
a first Distributed Unit (DU) that is communicably connected to the CU,
a second DU that is communicably connected to the CU, and
a Radio Unit (RU) that is communicably connected to the first DU and the second DU; and
until an amount of traffic being monitored in the RAN reaches a predetermined range,
selecting one operator, among the plurality of operators, that has entered into a guarantee type Service Level Agreement (SLA) with a user, and
instructing the CU, the first DU, and the second DU to cause the second DU to process, among data to be processed at the first DU for the RU, at least a portion of the data for a User Equipment (UE) that is communicably connected to the RU and that has entered into the guarantee type SLA with the selected operator.

9. A radio communication system comprising:
a Radio Access Network (RAN) that is shared by a plurality of operators, wherein the RAN comprises
a Central Unit (CU),
a first Distributed Unit (DU) that is communicably connected to the CU,
a second DU that is communicably connected to the CU, and
a Radio Unit (RU) that is communicably connected to the first DU and the second DU; and
a management apparatus of the RAN,
wherein the management apparatus comprises a processor that executes:
until an amount of traffic being monitored in the RAN reaches a predetermined range,
selecting one operator, among the plurality of operators, that has entered into a guarantee type Service Level Agreement (SLA) with a user; and
transmitting instructions to the CU, the first DU, and the second DU to cause the second DU to process, among data to be processed at the first DU for the RU, at least a portion of the data for a User Equipment (UE) that is communicably connected to the RU and that has entered into the guarantee type SLA with the selected operator.

\* \* \* \* \*